United States Patent
Yen et al.

(10) Patent No.: US 10,955,611 B2
(45) Date of Patent: Mar. 23, 2021

(54) THREE IN ONE COMBINATION IMAGING MODULE

(71) Applicant: Pixon Technologies Corp., New Taipei (TW)

(72) Inventors: Chih Ming Yen, New Taipei (TW); Shih Che Chen, New Taipei (TW); Yao Tsung Hsu, New Taipei (TW); Chien Liang Liao, New Taipei (TW)

(73) Assignee: Pixon Technologies Corp., New Taipei (TW)

( * ) Notice: Subject to any disclaimer, the term of this patent is extended or adjusted under 35 U.S.C. 154(b) by 0 days.

(21) Appl. No.: 16/527,556

(22) Filed: Jul. 31, 2019

(65) Prior Publication Data

US 2021/0033777 A1 Feb. 4, 2021

(51) Int. Cl.
*G02B 6/293* (2006.01)
*F21V 8/00* (2006.01)
*G02B 6/38* (2006.01)

(52) U.S. Cl.
CPC ......... *G02B 6/0095* (2013.01); *G02B 6/0073* (2013.01); *G02B 6/2937* (2013.01); *G02B 6/387* (2013.01)

(58) Field of Classification Search
CPC .. H04N 1/0285; G02B 6/0086; G02B 6/0088; G02B 6/009; G02B 6/0091; G02B 6/0093
See application file for complete search history.

(56) References Cited

U.S. PATENT DOCUMENTS

2015/0062670 A1* 3/2015 Yoshida ............. H04N 1/02835
358/482

\* cited by examiner

*Primary Examiner* — Sean P Gramling
(74) *Attorney, Agent, or Firm* — Muncy, Geissler, Olds & Lowe, P.C.

(57) ABSTRACT

A three in one combination imaging module comprising a light guide positioned in a light guide holder, a light emitting diode module, and a doublet or GRIN lens array held in a housing. The light guide holder and the housing comprise mating connecting elements. The connecting elements comprise locking elements, tabs, notches, slots, and clips that cooperate and interact in order to securely hold and accurately position each of the components in the housing without the use of adhesive. Light emitted by the light emitting diode module enters, travels through, and then exits the light guide and is received by the doublet or GRIN lens array and then focused on a sensor array and captured.

18 Claims, 8 Drawing Sheets

THREE IN ONE COMBINATION IMAGING MODULE

BACKGROUND OF THE INVENTION

Field of the Invention

The present invention relates to an imaging module. More specifically, the present invention discloses a three in one combination imaging module with mating connections to accurately position and securely hold components of the imaging module in order to reduce manufacturing time and costs.

Description of the Prior Art

Conventional imaging products utilize lenses and light sources to capture images of a source object. During manufacturing the lenses and light sources are glued into the device at fixed positions.

While these adhesion processes result in a usable device, there are numerous disadvantages to the conventional manufacturing method.

If the component is not accurately positioned, the obtained image will be out of focus in parts of or all of the image. This reduces the image quality.

Additionally, in order to move or remove the component, the adhesive must be reheated until the glue melts. After this, the component can be re-positioned into the correct position. This is time consuming and the rework lowers the overall quality of the product.

The shortcomings of the conventional device and method increase manufacturing time and labor costs which reduces profit.

Therefore, there is need for an imaging module that reduces manufacturing time and costs while allowing components to be easily replaced.

SUMMARY OF THE INVENTION

To achieve these and other advantages and in order to overcome the disadvantages of the conventional method in accordance with the purpose of the invention as embodied and broadly described herein, the present invention provides a three in one combination imaging module with improved manufacturing efficiency.

The three in one combination imaging module of the present invention comprises a doublet or Graded-Index (GRIN) lens array, a light guide, a light guide holder, a light emitting diode module, and a housing for accurately and securely holding the lens array, the light guide, the light guide holder, and the light emitting diode (LED) module, The doublet or GRIN lens array, the light guide, the light guide holder, the light emitting diode module, and the housing comprising mating elements, locking elements, tabs, notches, slots, and clips that interact in order to securely hold and accurately position each of the components in the housing.

The mating elements also simplify the manufacturing, assembling, and maintenance processes which reduces labor costs and manufacturing time and increases profits.

The doublet or GRIN lens array comprises a plurality of lenses that gathers light reflected from an object and focuses the light onto a sensor or sensors.

The LED module provides a light source for the imaging module. The LED module comprises a printed circuit board (PCB) or flexible printed circuit (FPC), and at least one LED.

The PCB or FPC comprises electrical circuitry and electrical connectors for receiving electrical power and providing power to the at least one LED to turn on the LED. The LEDs emit light into the light guide.

The light guide maximizes light reflection to provide a uniform emitted light and comprises a transparent or semi-transparent material. The light guide comprises a light entry surface and a light emitting surface. Light emitted by the LED module enters the light guide through the light entry end surface and the light exits the light guide through the light emitting surface. The emitted light illuminates a target object and is reflected to the doublet or GRIN lens array which focuses the light for sensors to capture an image of the target object.

As a result, the present invention provides a three in one combination imaging module that increases manufacturing and maintenance efficiency while increasing imaging quality.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 1:
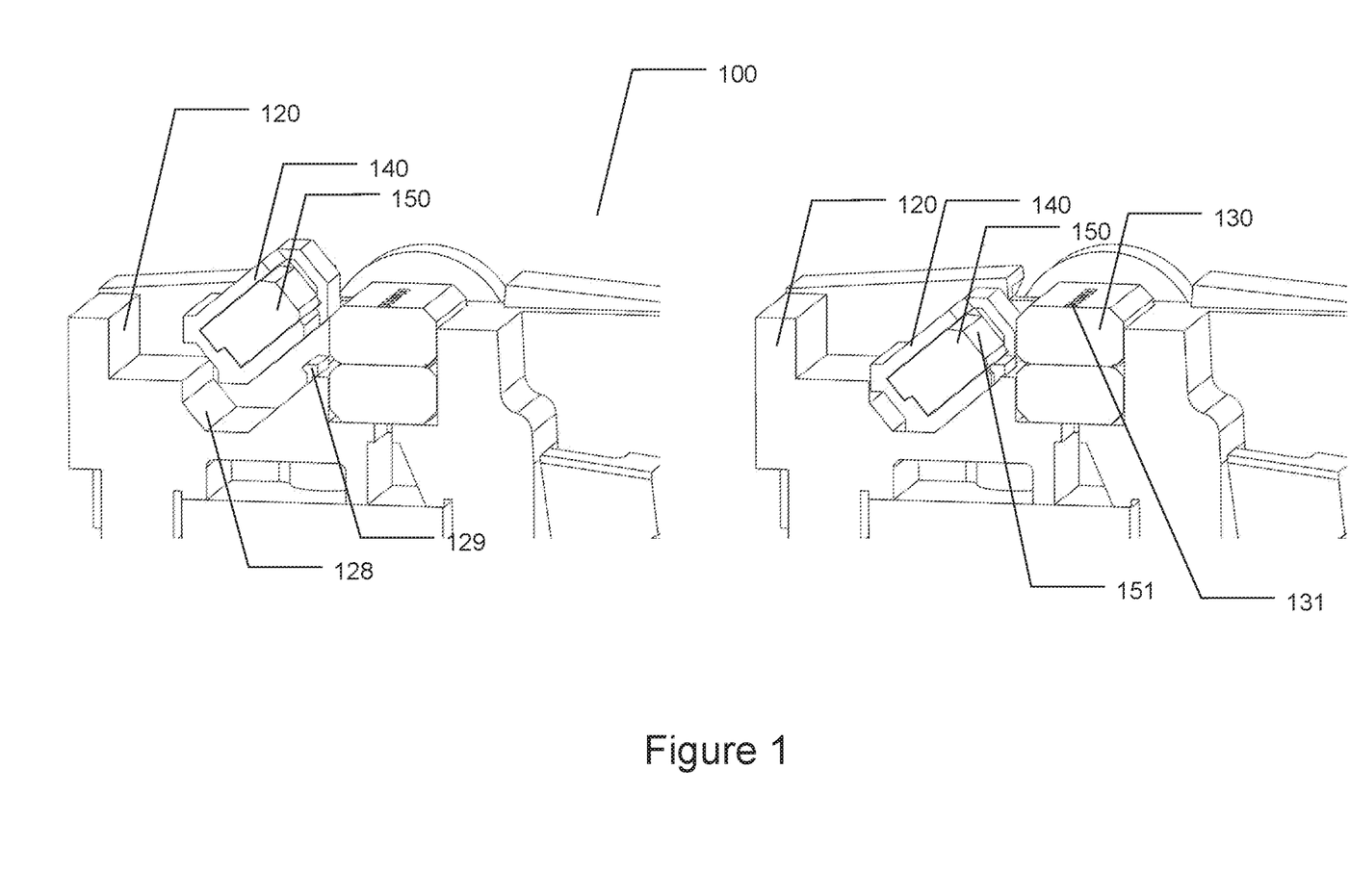
FIG. 1 is a drawing illustrating a three in one combination imaging module comprising a doublet or GRIN lens array, a light guide, a light guide holder, a LED module, and a housing with holder tab according to an embodiment of the present invention.

Refer to FIG. 1. The three in one combination imaging module 100 of the present invention comprises a doublet or GRIN lens array 130, a light guide 150, a light guide holder 140, and a housing 120.

The doublet or GRIN lens array 130 comprises a plurality of lenses 131 that gather light reflected from an object and focuses the light onto a sensor or sensors. The doublet or GRIN lens array 130 comprises two sets of lenses, one set of lenses 131 positioned on top of the other set of lenses.

The light guide 150 maximizes light reflection to provide a uniform emitted light via a light emitting surface 151 and comprises a transparent or semi-transparent material. The light guide 150 comprises a light entry surface and a light emitting surface 151. Light emitted by an LED module enters the light guide 150 through the light entry end surface and the light exits the light guide 150 through the light emitting surface 151. The emitted light illuminates a target object and is reflected to the doublet or GRIN lens array 130 which focuses the light for sensors to capture an image of the target object.

The light guide holder 140 securely holds the light guide 150 and prevents light from escaping and reflects light back into the light guide 150 in order to maximize the light emitted from the light guide 150.

The housing 120 accurately positions and securely holds the lens array 130 and the light guide holder 140, The light guide holder 140 and the housing 120 comprise mating elements, locking elements, tabs, notches, slots, and clips that interact in order to securely hold and accurately position the light guide holder 140 with the light guide 150 in the housing 120.

In this embodiment, the housing 120 of the three in one combination imaging module 100 comprises a holder seat 128 and a holder tab 129.

The holder seat 128 is shaped to match and accommodate the external surface of the light guide holder 140. The holder seat 128 accurately positions and supports the light guide holder 140. This accurate positioning allows light emitted from the light emitting surface 151 of the light guide 150 to effectively enter the upper lens 131 of the doublet or GRIN lens array 130.

When the light guide holder 140 is positioned into the holder seat 128, the holder tab 129 holds the light guide holder 140 thereby retaining the light guide holder 140 inside the holder seat 128 of the housing 120.

If the light guide 150 or the light guide holder 140 needs to be replaced, the light guide holder 140 is easily removed from the housing 120 by applying reverse pressure on the holder tab 129.

In embodiments of the present invention the holder seat 128 is an elongated trough running down the housing 120 in order to fully support the light guide holder 140.

In embodiments of the present invention a plurality of holder tabs 129 is utilized and spaced along the holder seat 128.

The holder seat 128 and holder tabs 129 are designed to prevent the light guide from twisting in the housing 120. As a result, the light exit angle is consistent along the length of the light guide 150.

Since the light guide holder 140 snaps into the housing 120 at the correct position, the light emitted by the light guide 150 is uniform and focused. As a result, manufacturing time is reduced and image quality is improved.

Figure 2:
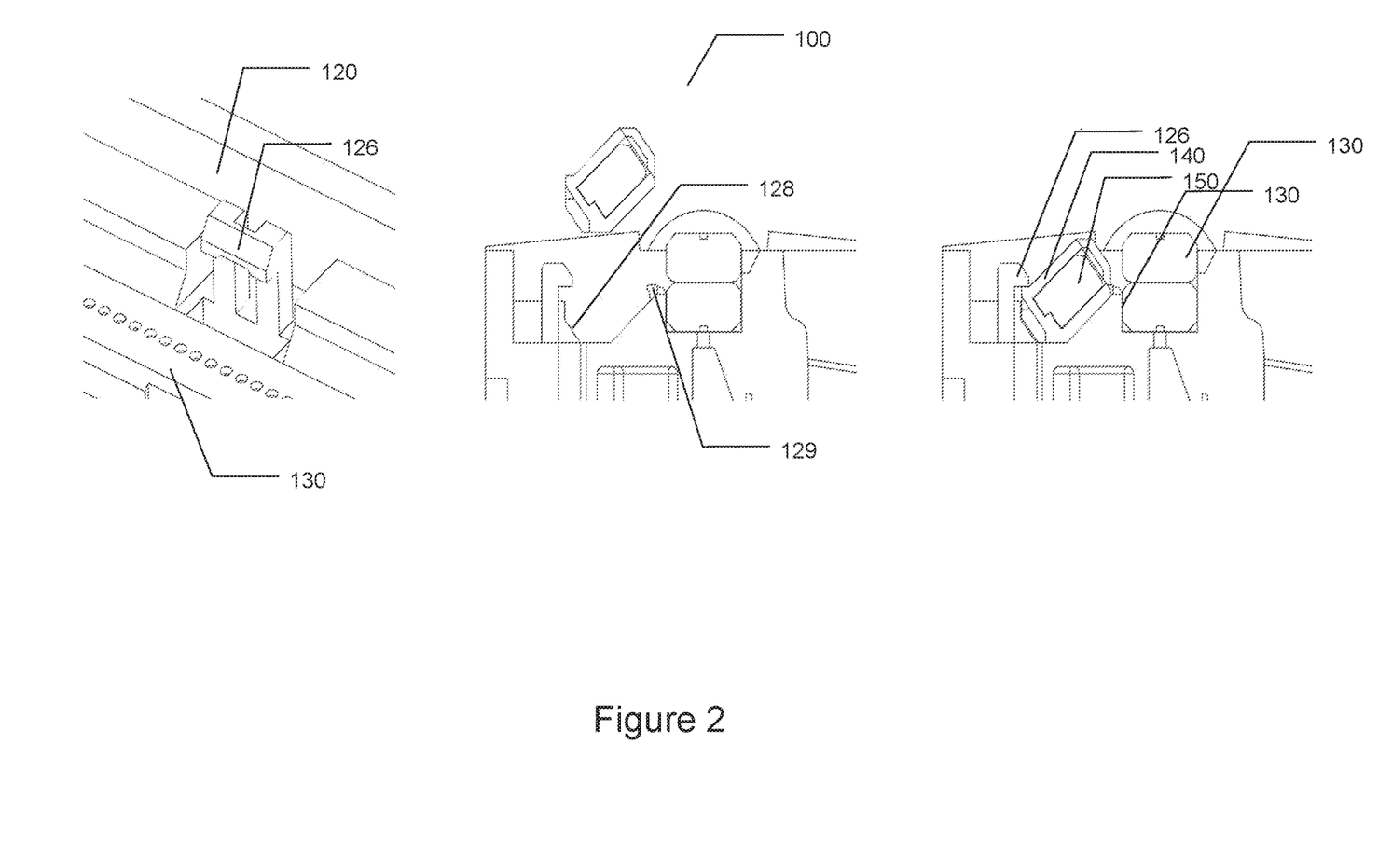
FIG. 2 is a drawing illustrating a three in one combination imaging module comprising a doublet or GRIN lens array, a light guide, a light guide holder, and a housing with holder tab and holder clasp according to an embodiment of the present invention.

Refer to FIG. 2. In the embodiment illustrated in FIG. 2, the housing 120 further comprises a holder clasp 126.

The holder clasp 126 snaps over an upper surface of the light guide holder 140. When the light guide holder 140 is positioned into the holder seat 128, the holder clasp 126 and the housing tab 129 hold the light guide holder 140 securely inside the holder seat 128 of the housing 120.

If the light guide 150 or the light guide holder 140 needs to be replaced, the light guide holder 140 is easily removed from the housing 120 by applying reverse pressure on the holder clasp 126.

Similar to the holder tab 129, in embodiments of the present invention a plurality of holder clasps 129 is utilized and spaced along the holder seat 128.

Figure 3:
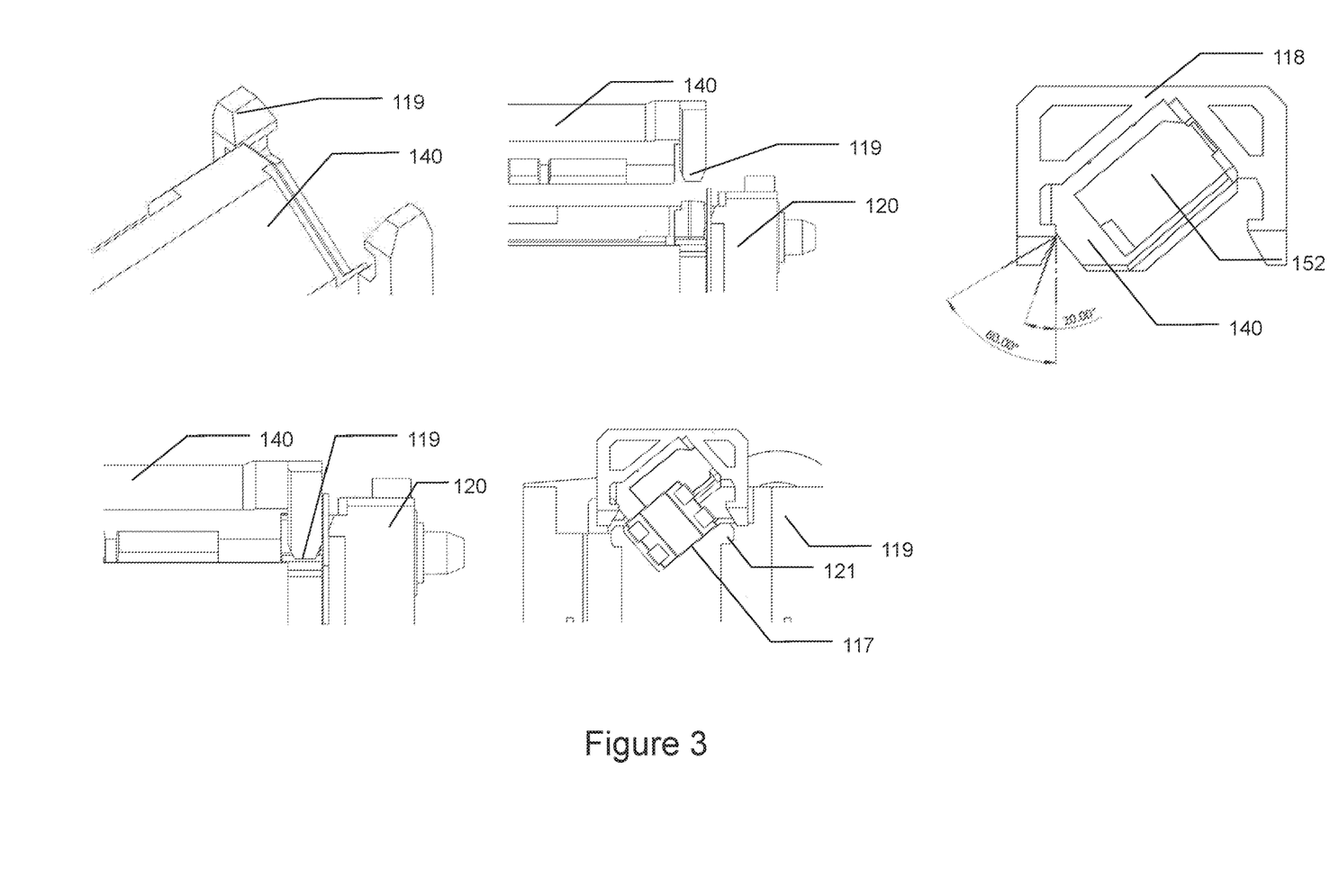
FIG. 3 is a drawing illustrating a three in one combination imaging module comprising a light guide, a light guide holder with holder legs, an LED module, and a housing with housing tabs according to an embodiment of the present invention.
Figure 4:
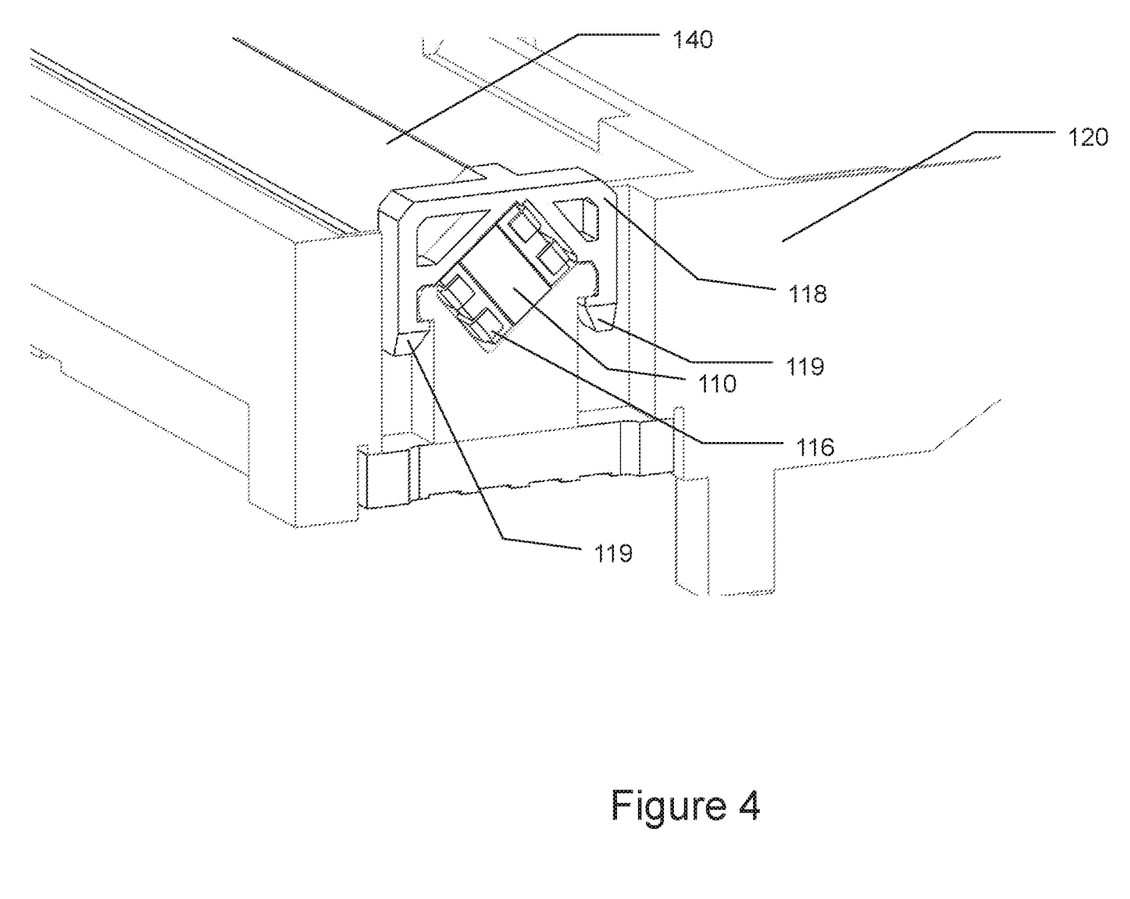
FIG. 4 is a drawing illustrating a three in one combination imaging module comprising a light guide, a light guide holder with holder legs, an LED module, and a housing with housing tabs according to an embodiment of the present invention.

Refer to FIG. 3 and FIG. 4. In embodiments, the light guide holder 140 further comprises an LED module holder 118.

The LED module holder 118 is disposed on an end of the light guide holder 140.

The LED module 117 comprises a PCB 110 with electrical connectors 116 and at least one LED. The electrical connectors 116 receive electrical power and provide the power to the LEDs.

The LED module 117 is inserted into an opening of the LED module holder 118.

When power is applied to the electrical connectors 116 the LEDs emit light into the light entry surface 152 of the light guide.

The LED module holder 118 further comprises a pair of holder legs 119. The holder legs have clasps that connect and lock onto housing tabs 121 of the housing 120. The holder legs 119 securely hold the light guide holder 140 to the housing 120. If the light guide 150 or the light guide holder 140 need to be replaced, reverse pressure is applied to the holder legs 119 and the clasps will disconnect with the housing tabs 121 and the light guide holder 140 can be easily removed from the housing 120.

The LED module holder 118 comprises an interior angle of 20 to 60 degrees to improve the speed of assembly and reduce deformations as well as avoiding interference with narrow tolerances PCBs.

Figure 5:
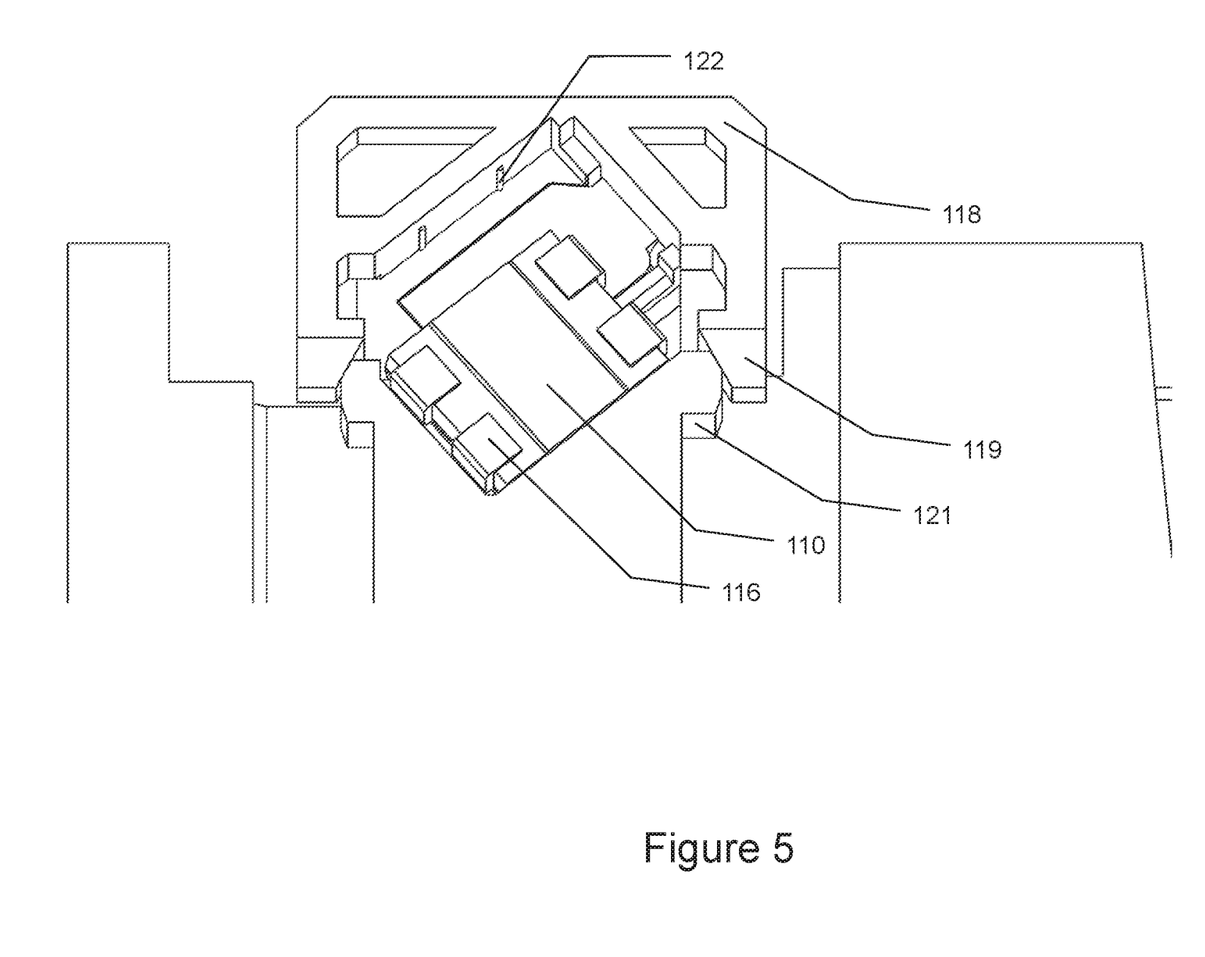
FIG. 5 is a drawing illustrating a three in one combination imaging module comprising a light guide holder with holder legs, an LED module, and a housing with housing tabs according to an embodiment of the present invention.

Refer to FIG. 5. In an embodiment the present invention the LED module holder 118 further comprises at least one module aligner 122. For example, a slot or a ridge is disposed on the LED module holder 118 that mates with an associated shape on the LED module 117. When the LED module 117 is inserted into the LED module holder 118 the module aligner 122 aligns and positions the LED module 117 in the correct position.

Figure 6:
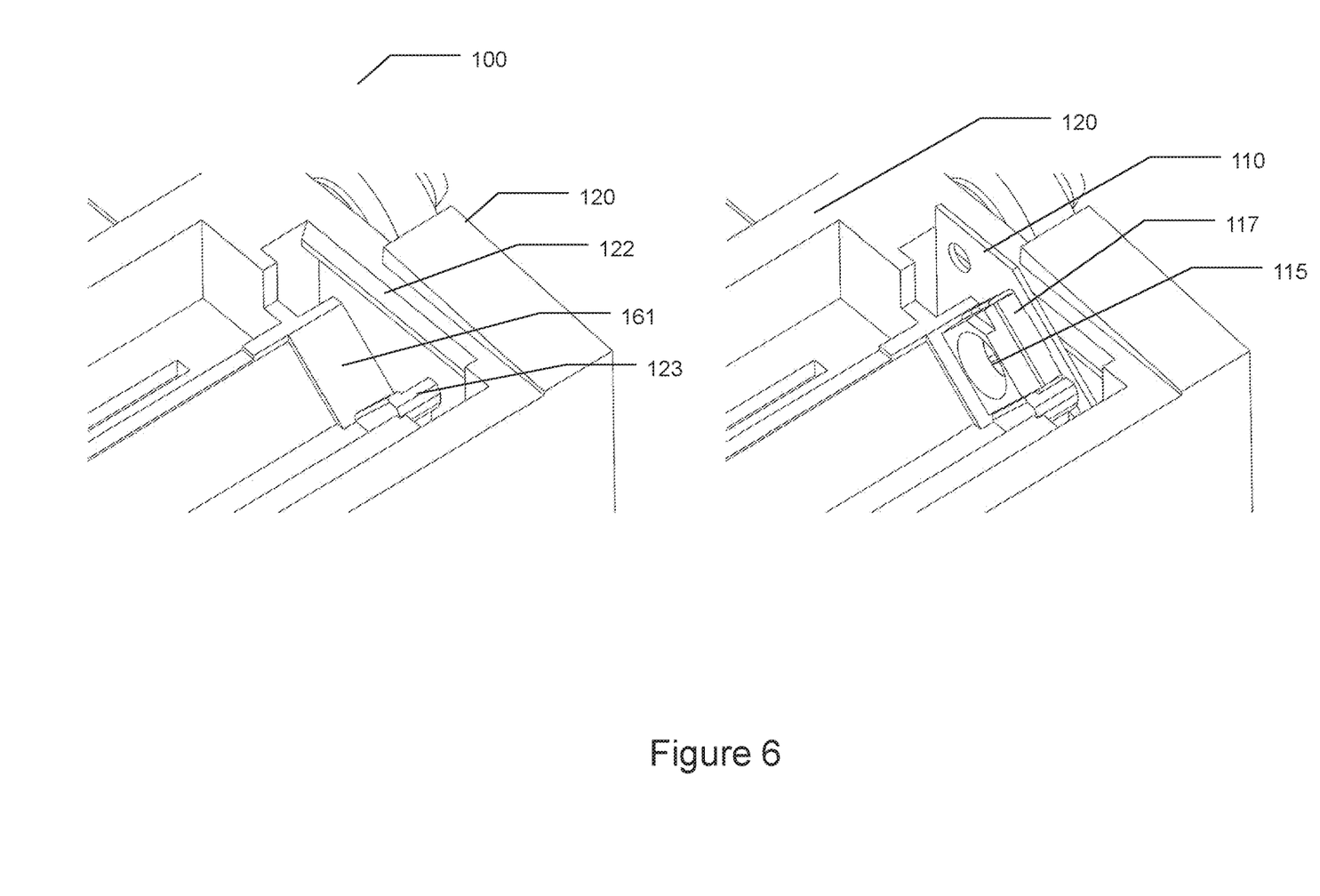
FIG. 6 is a drawing illustrating a three in one combination imaging module comprising an LED module with PCB or FPC, and a housing with module tab and PCB, or FPC locking tab according to an embodiment of the present invention.

Refer to FIG. 6. In an embodiment the housing comprises a PCB locking tab 122. When the PCB or FPC 110 is inserted into the housing 120, the PCB locking tab 122 covers the top of the PCB 110 and holds the PCB 110 in a secure position in the housing 120.

The housing 120 further comprises a module seat 161 for supporting the LED module 117 with LED 115.

An LED module tab 123 is disposed next to the module seat 161 for holding and positioning the LED module 117 in the housing 120.

The module seat 161, the LED module tab 123, and the PCB or FPC locking tab 122 cooperate to ensure the LED module 117 and the LED 115 are accurately positioned in order to provide optimal emitted light into the light entry surface of the light guide.

Figure 7:
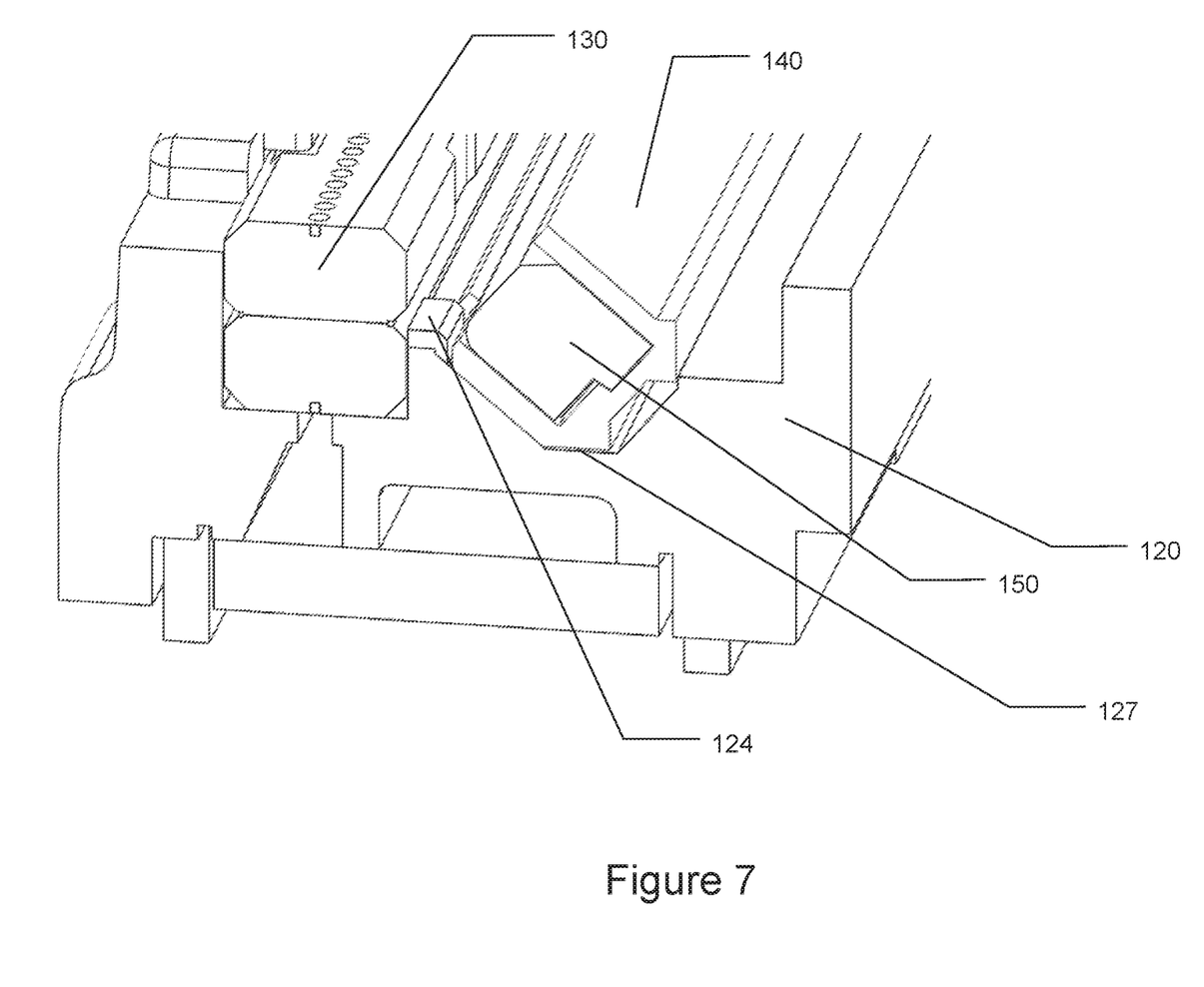
FIG. 7 is a drawing illustrating a three in one combination imaging module comprising a doublet or GRIN lens array and a housing with lens array locking tabs according to an embodiment of the present invention.

Refer to FIG. 7. In the embodiment of the present invention illustrated in FIG. 7, the housing 120 further comprises a light guide holder clasp 124 for retaining the light guide holder 140 in the housing 120.

When the light guide holder 140 is inserted into the housing opening 127 of the housing 120, the light guide holder clasp 124 grasps the surface of the light guide holder 140 and securely holds the light guide holder 140 inside the housing 120.

The light guide holder clasp 124 allows the light guide holder 140 to be automatically installed into the housing 120 at the correct position and held securely.

If the light guide holder 140 needs to be replaced, the light guide holder 140 is easily removed from the housing 120 by applying reverse pressure on the light guide holder clasp 124.

Figure 8:
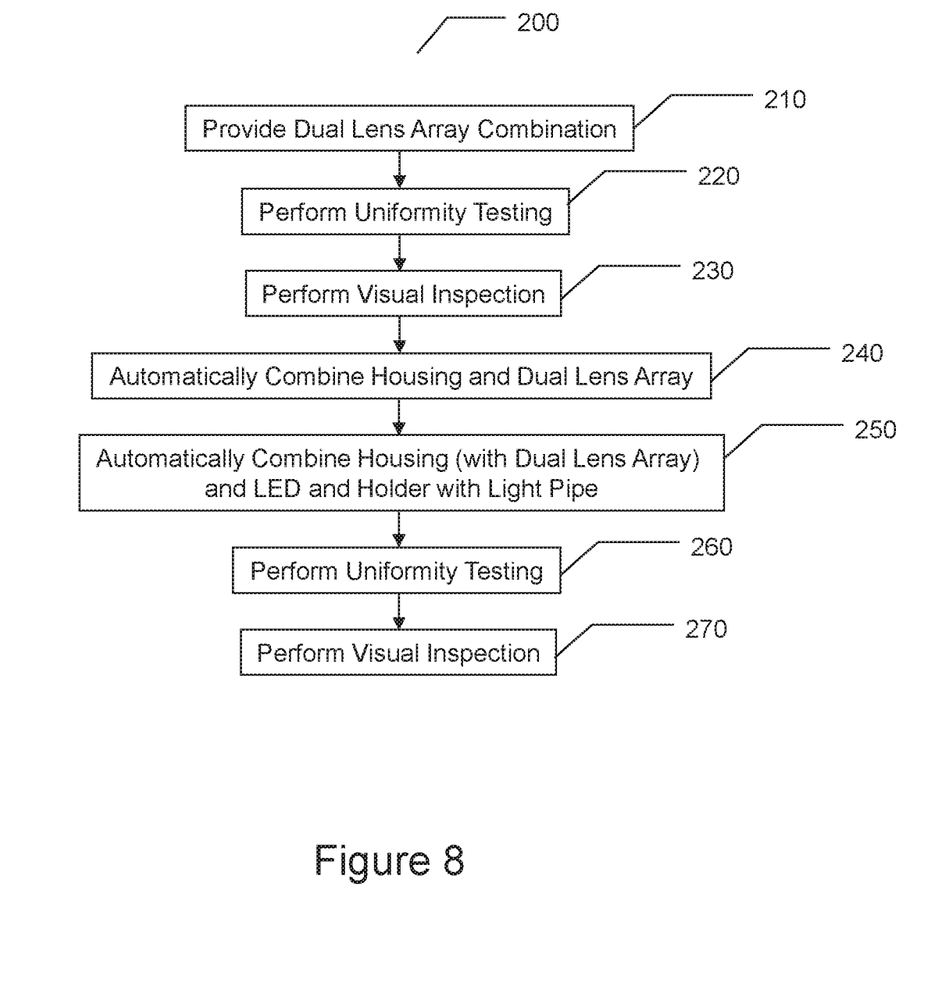
FIG. 8 is a flowchart illustrating a method for manufacturing a three in one combination imaging module according to an embodiment of the present invention.

Refer to FIG. 8. The method for manufacturing a three in one combination imaging module 200 according to an embodiment of the present invention begins in Step 210 by providing a doublet or GRIN lens array module. In Step 220 a uniformity test is performed on the doublet or GRIN lens array to detect any inconsistencies. A visual inspection is performed on the doublet or GRIN lens array in order to identify any defects in Step 230.

In Step 240 the doublet or GRIN lens array is automatically installed into the housing. The LED modules and the light guide holder with light guide are automatically installed into the housing in Step 250.

In Step 260 a uniformity test is performed on the three in one combination imaging module to detect non-uniformity or non-conformity. A visual inspection of the three in one combination imaging module is performed in order to identify any defects in Step 270.

Since hot melting and dispensing of adhesives are not used and components are automatically installed, the manufactured parts per hour is improved, costs are reduced, and profits are increased.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An imaging module comprising:
a light guide holder for containing a light guide;
a light emitting diode module comprising at least on light emitting diode;
a doublet or GRIN lens array; and
a housing for holding the light guide holder, the light emitting diode module, and the doublet or GRIN lens array, light emitted by the light emitting diode traveling through the light guide and exiting the light guide and received by the doublet or GRIN lens array; wherein the light guide holder, the light emitting diode module, the doublet or GRIN lens array, and the housing comprise mating connecting elements that cooperate to secure the light guide holder, the light emitting diode module, and the doublet or GRIN lens array to the housing,
wherein the housing comprises a holder seat for supporting the light guide holder,
wherein the holder seat is shaped with a bottom surface and two inclined guiding surfaces, and
wherein the bottom surface is connected between the two inclined guiding surfaces to match and accommodate an external surface of the light guide holder.

2. The imaging module of claim 1, the light guide holder comprising a light emitting diode module holder for securing and positioning the light emitting diode module.

3. The imaging module of claim 1, the light guide holder comprising a pair of holder legs for connecting with housing tabs of the housing.

4. The imaging module of claim 1, the light guide holder comprising a module aligner for mating with the light emitting diode module to accurately align the light emitting diode module.

5. The imaging module of claim 1, the housing comprising a holder tab for positioning the light guide holder.

6. The imaging module of claim 1, the housing comprising a housing tab connecting with a pair of holder legs for securing the light guide holder to the housing.

7. The imaging module of claim 1, the housing comprising a lens array locking tab for securing the doublet or GRIN lens array assembly to the housing.

8. The imaging module of claim 1, the housing comprising a printed circuit board locking tab for holding a printed circuit board of the light emitting diode module to the housing.

9. The imaging module of claim 1, the housing comprising a module seat for supporting the light emitting diode module in the housing.

10. The imaging module of claim 1, the housing comprising a module tab for positioning the light emitting diode module in the housing.

11. An imaging module comprising:
a light guide holder comprising a light emitting diode module holder, the light emitting diode module holder comprising an opening for holding a light emitting diode module, a pair of holder legs, and a module aligner for positioning the light emitting diode module in the light emitting diode module holder; and
a housing for securely holding the light guide holder and the light emitting diode module, the housing comprising:
a holder seat for supporting the light guide holder, wherein the holder seat is shaped with a bottom surface and two inclined guiding surfaces, and the bottom surface is connected between the two inclined guiding surfaces to match and accommodate an external surface of the light guide holder;
a holder tab for positioning the light guide holder;
a housing tab connecting with the pair of holder legs for securing the light guide holder to the housing; and
a lens array locking tab for securing a doublet or GRIN lens array assembly to the housing.

12. The imaging module of claim 11, the housing comprising a printed circuit board locking tab for holding a printed circuit board of the light emitting diode module to the housing.

13. The imaging module of claim 11, the housing comprising a module seat for supporting the light emitting diode module in the housing.

14. The imaging module of claim 11, the housing comprising a module tab for positioning the light emitting diode module in the housing.

15. An imaging module comprising:
- a light guide holder comprising a light emitting diode module holder, the light emitting diode module holder comprising an opening for holding a light emitting diode module, a pair of holder legs, and a module aligner for positioning the light emitting diode module in the light emitting diode module holder;
- a light guide comprising a light entry surface and a light emitting surface, the light guide comprising a transparent or semi-transparent material;
- a light emitting diode module comprising a printed circuit board and at least one light emitting diode mounted on the printed circuit board, the light emitting diode emitting light into the light entry surface of the light guide;
- a doublet or GRIN lens array for receiving light emitted by the light emitting surface and focusing the light onto at least one sensor; and
- a housing for securely holding the light guide holder and the light emitting diode module, the housing comprising:
  - a holder seat for supporting the light guide holder, wherein the holder seat is shaped with a bottom surface and two inclined guiding surfaces, and the bottom surface is connected between the two inclined guiding surfaces to match and accommodate an external surface of the light guide holder;
  - a holder tab for positioning the light guide holder;
  - a housing tab connecting with the pair of holder legs for securing the light guide holder to the housing; and
  - a lens array locking tab for securing a doublet or GRIN lens array assembly to the housing.

16. The imaging module of claim 15, the housing comprising a printed circuit board locking tab for holding a printed circuit board of the light emitting diode module to the housing.

17. The imaging module of claim 15, the housing comprising a module seat for supporting the light emitting diode module in the housing.

18. The imaging module of claim 15, the housing comprising a module tab for positioning the light emitting diode module in the housing.

* * * * *